J. W. BLACKLEDGE.

SHOCK ABSORBER FOR VEHICLES.

APPLICATION FILED MAR. 15, 1919.

1,377,613.

Patented May 10, 1921.

Witnesses:
R. Burkhardt.
Milton G. Miller

Inventor:
John W. Blackledge
By Wilkinson & Huxley
Attys

J. W. BLACKLEDGE.
SHOCK ABSORBER FOR VEHICLES.
APPLICATION FILED MAR. 15, 1919.

1,377,613.

Patented May 10, 1921

Witnesses:
R Burkhardt
Milton J. Miller

Inventor
John W. Blackledge
By Wilkinson & Huxley
Attys.

UNITED STATES PATENT OFFICE.

JOHN W. BLACKLEDGE, OF CHICAGO, ILLINOIS.

SHOCK-ABSORBER FOR VEHICLES.

1,377,613. Specification of Letters Patent. Patented May 10, 1921.

Application filed March 15, 1919. Serial No. 282,928.

*To all whom it may concern:*

Be it known that I, JOHN W. BLACKLEDGE, a citizen of the United States, residing at Chicago, in the county of Cook and State of Illinois, have invented certain new and useful Improvements in Shock-Absorbers for Vehicles, of which the following is a specification.

The present invention relates to shock absorbers of the same general type as that covered by my co-pending application, Serial No. 208,781, filed December 26th, 1917, and has for its object to provide an improved construction and arrangement of parts comprising the shock absorber, and particularly the torsion spring used for returning the parts to normal position, and the manner of attaching this spring to the parts of the shock absorber with which it coöperates, whereby the efficiency of the resistance imposed by the spring is increased, particularly toward the end of the movement which it opposes.

One embodiment of the present invention is shown, by way of illustration, in the accompanying drawings. In said drawings—

Figure 2:
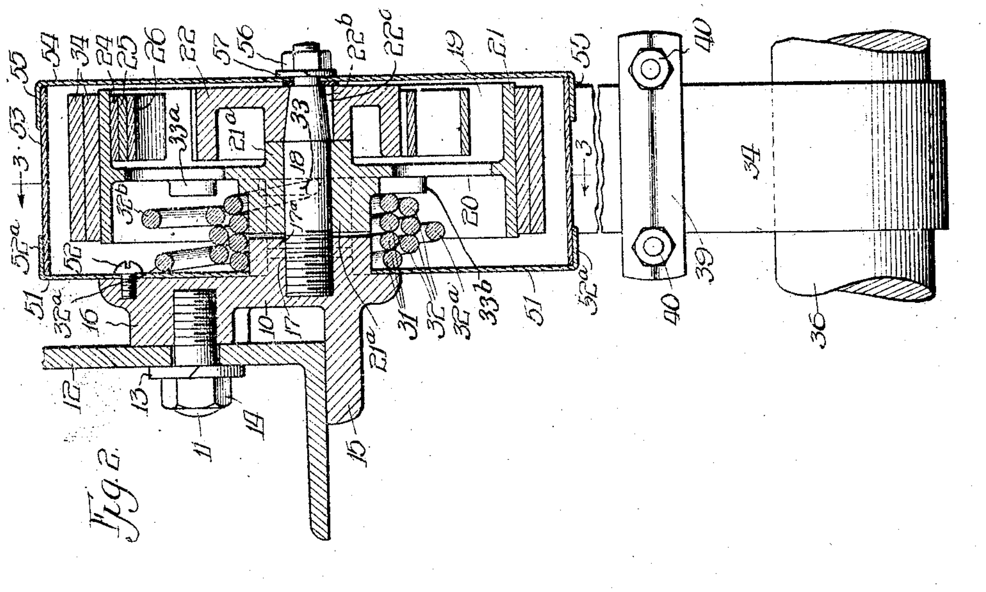
Fig. 2 is a sectional view on line 2—2 of Fig. 1.
Figures 1, 6:
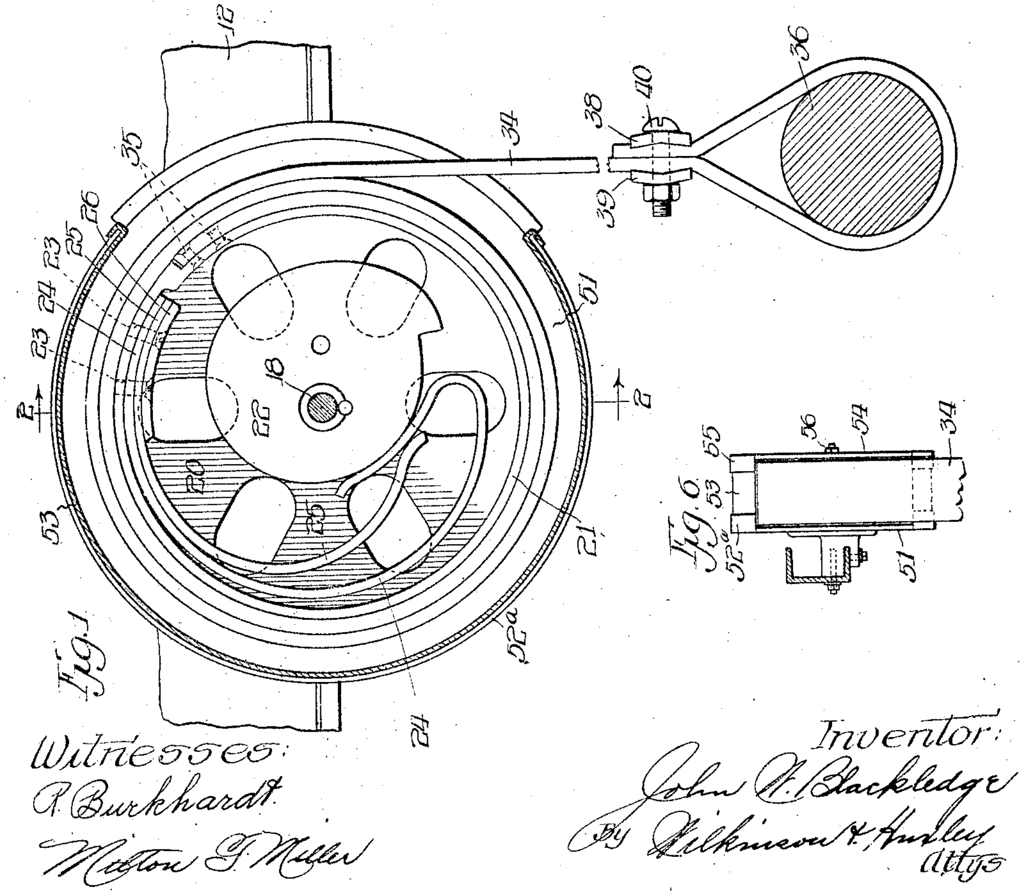
Figure 1 is a side view in elevation of my improved shock absorber with the cover removed.
Fig. 6 is a view showing the bracket for attaching the shock absorber to the inside of the frame of an automobile.

Referring now specifically to the drawings and in which like reference characters refer to like parts throughout, a bracket 10 is shown to which a stud bolt 11 is secured which passes through the automobile frame 12, and which has a nut 14 thereon with a lock washer 13 interposed between the nut and automobile frame so that the bracket 10 is held securely against the side of the automobile frame 12, the bracket 10 having a lip portion 15 which is integral with the said bracket and which is adapted to extend under the automobile frame 12 so as to prevent the rotation of the bracket 10. The bracket 10 has a head portion 16 formed integrally with the said bracket and within which the stud bolt 11 is inserted in threaded engagement with the said bracket, which portion 16 of the bracket 10 is held securely against the side of the frame 12. On the inner face of the bracket 10 is a projection or hub portion 17 within which an axle 18 is inserted in threaded engagement with said hub portion, a pin $17^a$ passing through the axle 18 and the portion 17. The axle 18 has mounted thereon a rotatable drum 19 comprising a web portion 20, the hub $21^a$ extending on each side of the web 20, a rim portion 21, and a hub $21^a$. Mounted upon the tapered end of axle 18 beyond the drum 19, is a cam member 22 which is held against rotation by a key $22^a$ inserted in a key seat $22^b$ cut in the cam member 22 and in the axle 18. Secured to the rim portion 21 of the drum 19 by means of rivets or screws 23, 23, is a pair of leaf springs 24 and 25, the said rivets 23, 23 passing through the base of the springs 24 and 25 and also through a reinforcing spring 26 which serves to more securely hold the springs in position. The free end of the spring 24 is folded backward and into proper position for sliding engagement with the surface of the cam member 22 and has the free end of the spring 25 in engagement with its free end to increase the pressure of spring 24 against the surface of the cam member 22. As thus far described the device may correspond substantially in general arrangement and operation with the device disclosed in my co-pending application referred to.

On the inner face of the bracket 10 is a pair of inwardly projecting lugs 28, 29 for anchoring and guiding the rewinding spring 30. Spring 30 is secured around the hub portion 17 of the bracket 10 and the hub portion $21^a$ of the drum 19 with one end $30^a$ anchored to the fixed bracket 10 by hooking it under the lug 28 and passing it over the lug 29, and with its other end $30^b$ anchored to the revoluble drum by hooking it under one of the lugs 33, $33^a$, $33^b$ carried by the drum. Spring 30 comprises a plurality of inner coils 31 approximating the form of a helix loosely surrounding the hub provided by the two members 17 and $21^a$, and connecting at one end with one of the spring anchorages, preferably that which is on the rotatable drum; also intermediate coils 32 surrounding the inner coils 31 and merging with the latter at the end opposite said anchorage; also outer coils $32^a$ and $32^b$ aggregating preferably about one and one half convolutions and terminating at the other anchorage end, preferably the fixed anchorage on the bracket 10. Spring 30 is confined axially between the wall or cover 51, which rests against the main bracket 10, and the web 20 of the drum 19.

While the described method of anchoring and confining the spring is preferable and insures the fullest realization of the aims of the present invention, different means for anchoring the ends of the spring, or the reversal of the ends of the spring with respect to the particular members to which they are anchored, would not be outside the scope of the present invention.

With the construction and arrangement of spring above described, it will be seen that I have provided an axially extended inner coil having a power transmitting end $30^a$ extending outwardly so that its point of engagement with the drum 21 is radially remote from the coil; also an intermediate axially extended coil 32 nested upon the inner coil and merging at one end with said inner coil in such manner that when the drum revolves and the spring is wound by the strap 34, an additional convolution of the intermediate coil seeks to wedge into the inner coil to increase the axial dimension of the latter and so increase the co-efficient of resistance of the whole coil to the winding action of the drum as the end of such winding action is approached; and a relatively large and free running outer coil which is radially spaced from the inner and intermediate coils, and which so increases the total length of the spring as to permit all necessary revolution of the drum, even up to approximately a full revolution of the drum. without doing violence to the spring or giving it a permanent set or developing undue fatigue in the spring structure. Moreover, the whole spring, notwithstanding its length, may be housed within relatively small dimensions, both diametric and axial; the form of spring will facilitate assembly in completely unwound condition without the use of special tools or fixtures, it being merely necessary to engage the anchoring end $30^a$ of the spring with the fixed lugs 28, 29, and then place the drum 19 over the axle 18 in relative circumferential position to bring the desired lug 33, $33^a$, or $33^b$ behind the power transmitting end $30^b$ of the spring, and then rotate the drum, through means of the strap wound thereon, sufficiently to develop desired initial tension. The spring will preferably be wound to develop an axially extending stress that will retain its ends in engagement with the respective lugs upon which they are anchored. The space within which the spring 30 is confined may be increased or diminished by regulating the distance that the drum 19 is forced upon the axle 18, by means of the nut 56 and therefore the resistance of the spring 30 can be increased or diminished by tightening or loosening the nut 56 as may be desired. A flexible member or strap 34 is provided which passes around the rim of the drum and has its inner end secured to the rim of the drum by means of a pair of rivets 35, 35, or in any other suitable manner. The other end of the strap is passed around an axle 36 of an automobile, or through the loop of the bracket illustrated in Fig. 4, and the free end secured upon the strap by means of a clamp comprising a pair of curved members 38 and 39 having their concave edges turned inwardly toward each other and held together by means of a pair of bolts 40, 40. It will thus be understood that as the members 38 and 39 are drawn together the bolts 40, 40 the edge of the members 38 and 39 will be pressed into the strap 34 and thus the strap will be securely held in position.

Figure 4:
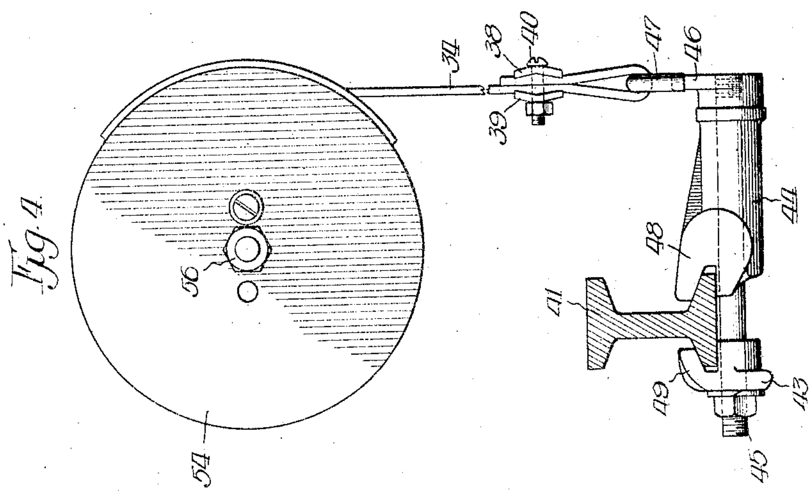
Fig. 4 is a view in elevation showing the axle clamp employed for securing the strap of the shock absorber to the front axle of an automobile.
Figures 3, 5:
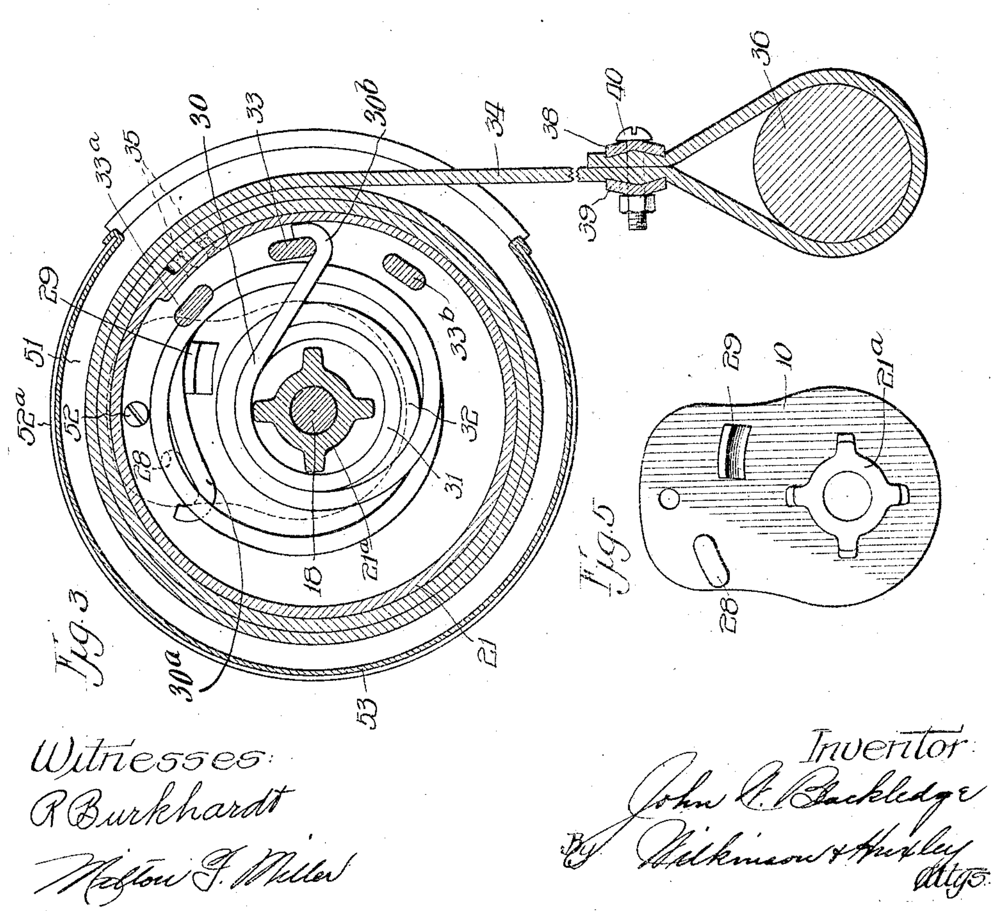
Fig. 3 is a sectional view on line 3—3 of Fig. 2.
Fig. 5 is a view in elevation of the face of the bracket showing lugs to which the spring is anchored.

Referring now specifically to Fig. 4 in which I show means for securing the strap to the front axle 41 of a car 43, 44 are gripping members through which a bolt 45 passes, and to which is secured a head portion 46 having a loop 47 formed integrally therewith and through which the strap 34 passes and is clamped by means of clamping members 38 and 39 such as I have described heretofore. The members 43 and 44 have jaw portions 48 and 49 respectively which are adapted to conform to the flange of the I-beam axle 41. The bolt 45 can of course be turned to any position so that the loop 47 is always in proper alinement with respect to the strap 34. It will be understood that the front axles of cars instead of presenting a level surface are often inclined so that if a solid clamp were secured to them the loop such as 47 would not be in proper alinement to receive the strap. By this means I am able to secure a clamp to the front axle of any type of I-beam construction and secure the proper alinement between the clamp and the strap connecting the drum to the bracket. The inside cover portion 51 is held securely against the bracket by means of a screw 52 secured to the portion 16 of the bracket 10. The cover member has a flange $52^a$ formed thereon and is secured over the edge of a circular drum-shaped cover member 53 which surrounds the drum for approximately three-fourths of the distance, an open space as shown in Fig. 3 being left so the strap 34 may pass therethrough to the drum 19. An outside cover member 54 is provided having an inwardly turned flange 55 which is secured over the wall of the cover 53. The outside cover 54 is held in position by means of the nut 56 in threaded engagement with the axle 18, together with lock washer 57 between the nut and cover. When the absorber is attached to the car the strap is adjusted in such manner so that there is always a tension on the torsion spring of the absorber and keeps the strap taut at all times.

It will thus be understood that the drum 19 is rotatable upon the axle 18 and that as the springs of the automobile are compressed the spring 30 will turn the drum so as to keep the slack in the strap 34 taken up and also that the drum is enabled to rotate easily as the spring 24 is moving down hill on the cam toward the shoulder 27 and as soon as the springs of the automobile rebound, the strap 34 being taut, resistance against the rebound of the automobile springs will be met with, which, by reason of the winding up of the torsion spring 30 and the action of the spring upon the inclined surface of the cam 22, is such that as the springs of the automobile rebound farther, increasing resistance is given by the shock absorber until the shock of the rebound is overcome entirely. The length of the spring and the method of winding secure to the shock absorber a great amount of flexibility and of quickness to respond to any move of rotation of the drum 19. It will also be understood that if the drum is rotated far enough the friction spring 24 will be pressed outwardly until it rests against the flange 21 of the drum 19, the distance between the surface of cam 22 at its highest point and the flange 21 being less than the radial dimension of the portion of the spring that is bent in developing the friction shoe, so that spring 24 becomes wedged between the surface of the cam 22 and the rim 21 of drum 19 and thus acts more effectively upon cam 22 in imposing its frictional resistance to the rotation of the drum, and may even have the effect of a yielding limiting stop in case of extreme revolution of the drum, thereby affording an additional safeguard against injury to the vehicle springs in case of excessive rebounding force. This feature is claimed in my previous application aforesaid.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A shock absorber comprising relatively rotatable members adapted for connection, respectively, with two parts to be controlled, and a return spring for the rotatable member comprising an inner coil and a surrounding coil nested upon said inner coil; said spring having attaching ends connected with the respective relatively rotatable members.

2. A shock absorber comprising relatively rotatable members adapted for connection, respectively, with two parts to be controlled, and a return spring for the rotatable members comprising an inner axially extending coil and an axially extending surrounding coil nested upon said inner coil and tending to add to the axial dimension of said inner coil as the spring winds; said spring having its ends connected with the respective relatively rotatable members.

3. A shock absorber comprising relatively rotatable members adapted for connection, respectively, with two parts to be controlled, a return spring having ends connected, respectively, with the relatively rotatable members, and walls confining said spring axially; said spring comprising an inner axially extending coil and a coil wound upon and tending to crowd into the helix of the inner coil when the spring is wound.

4. In a shock absorber, relatively rotatable members, and a return spring having ends connected to the respective relatively rotatable members; said spring comprising an inner coil in substantially the form of a helix, an intermediate coil nested upon said inner coil, and an outer coil freely surrounding said intermediate coil.

5. In a shock absorber, fixed and rotatable members, and a return spring for said members having its respective ends anchored thereon; said spring comprising a series of coils one within another and developing circumferential resiliency opposing relative rotation between said members and axial resiliency which holds the ends of the spring in connection with the respective members.

6. In a shock absorber, coaxial fixed and rotating members having opposed faces provided with spring anchoring lugs, and a return spring located between said opposed faces, with its respective ends engaging the lugs on said members; said spring comprising a series of coils located one within another.

7. In a shock absorber, coaxial fixed and rotating members having opposed faces provided with spring anchoring lugs, and a return spring located between said opposed faces, with its respective ends engaging the lugs on said members; said spring comprising a series of coils located one within another; the anchoring lug on one member being multiplied in circumferential series to provide adjustable anchorage for the end of the spring which it receives.

8. In a shock absorber, a fixed member carrying a spindle, a rotatable member mounted on said spindle, and a return spring confined between the fixed and rotatable members and constructed to increase its axial dimension as the spring is wound.

9. In a shock absorber, a fixed member carrying a spindle, a rotatable member mounted on said spindle, and a return spring confined between the fixed and rotatable members and constructed to increase its axial dimension as the spring is wound; means being provided to adjust the space between the fixed and rotatable members.

10. In a shock absorber, a fixed member carrying a spindle, a rotatable member mounted on said spindle and providing between it and the fixed member a spring chamber with opposed walls, and a return spring having its respective ends secured to the fixed and rotatable members and comprising a substantially helical coil which winds in the space between the opposed walls of the members and tends to increase the axial dimension of the spring in winding.

11. In a shock absorber, a fixed member carrying a spindle, a rotatable member mounted on said spindle and providing between it and the fixed member a spring chamber with opposed walls, and a return spring having its respective ends secured to the fixed and rotatable members and comprising a substantially helical coil which winds in the space between the opposed walls of the members and tends to increase the axial dimension of the spring in winding; said spindle carrying means for forcing the rotatable member toward the fixed member and thereby regulating the space in which the spring winds.

Signed at Chicago, Illinois, this fifteenth day of February, 1919.

JOHN W. BLACKLEDGE.